(12) United States Patent
Bailey et al.

(10) Patent No.: US 11,340,184 B2
(45) Date of Patent: May 24, 2022

(54) ENGINE COMPONENT PERFORMANCE INSPECTION SLEEVE AND METHOD OF INSPECTING ENGINE COMPONENT

(71) Applicant: General Electric Company, Schenectady, NY (US)

(72) Inventors: Jeremy Clyde Bailey, Liberty Township, OH (US); Pepe Palafox, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 654 days.

(21) Appl. No.: 16/180,303

(22) Filed: Nov. 5, 2018

(65) Prior Publication Data

US 2020/0141888 A1 May 7, 2020

(51) Int. Cl.
*G01N 25/72* (2006.01)
*F02C 7/18* (2006.01)

(52) U.S. Cl.
CPC ............ *G01N 25/72* (2013.01); *F02C 7/18* (2013.01); *F05D 2220/32* (2013.01); *F05D 2260/80* (2013.01)

(58) Field of Classification Search
CPC ......... F01D 25/12; F01D 9/041; G01N 23/00; G01N 25/72; G01N 2001/2282; G01K 11/20; G01K 11/12; G01K 1/143; G01K 17/00; G01K 17/20; G01K 1/02; G01K 13/006; G01K 2203/00; F05D 2220/32; F05D 2260/20; F05D 2300/502; F05D 2260/80; F05D 2260/83
See application file for complete search history.

(56) References Cited

U.S. PATENT DOCUMENTS

| | | | |
|---|---|---|---|
| 4,644,162 A | 2/1987 | Bantel et al. | |
| 5,111,046 A | 5/1992 | Bantel | |
| 6,153,889 A * | 11/2000 | Jones | G01N 25/72 250/559.45 |
| 6,690,016 B1 * | 2/2004 | Watkins | G01N 25/72 250/341.7 |
| 7,095,495 B2 | 8/2006 | Bowles et al. | |
| 7,388,204 B2 * | 6/2008 | Key | G01N 25/72 250/339.03 |
| 8,244,488 B2 | 8/2012 | Allen et al. | |
| 8,342,741 B2 * | 1/2013 | Mueller | G01D 3/08 374/1 |

(Continued)

FOREIGN PATENT DOCUMENTS

EP 094391623 9/1999

OTHER PUBLICATIONS

European Patent Office, European Search Report re Application No. 19206233.9-1006, dated Jan. 7, 2020, 7 pages, Munich, Germany.

*Primary Examiner* — Gail Kaplan Verbitsky
(74) *Attorney, Agent, or Firm* — McGarry Bair PC

(57) ABSTRACT

An apparatus and method for inspecting cooling holes in an engine component can include a cover that is placed over the engine component and positioned proximate at least some of the cooling holes. A fluid is passed through the engine component to exhaust out of the cooling holes and impinge upon the cover. Analysis of the signature of the fluid impinging on the cover can be used to determine operation of the cooling holes with comparison of the signature to a reference signature.

12 Claims, 7 Drawing Sheets

(56) References Cited

U.S. PATENT DOCUMENTS

| | | | |
|---|---|---|---|
| 8,768,646 B2 | 7/2014 | Key | |
| 8,866,084 B2 | 10/2014 | Baleine et al. | |
| 9,080,453 B2* | 7/2015 | Shepard | F01D 5/187 |
| 9,182,318 B2 | 11/2015 | McCaldon | |
| 9,274,009 B2 | 3/2016 | Key | |
| 9,646,291 B2 | 5/2017 | Britt | |
| 10,197,474 B2* | 2/2019 | Wang | F01D 21/003 |
| 10,297,680 B2* | 5/2019 | Umemoto | H01L 29/7371 |
| 10,665,909 B2* | 5/2020 | Campbell | H01M 10/4257 |
| 10,845,253 B2* | 11/2020 | Wang | G01L 1/248 |
| 2004/0054495 A1* | 3/2004 | Tregub | G01N 25/4846 |
| | | | 702/134 |
| 2005/0010444 A1* | 1/2005 | Iliff | G06Q 50/22 |
| | | | 705/2 |
| 2006/0159939 A1* | 7/2006 | Lampenscherf | G01K 11/20 |
| | | | 428/469 |
| 2012/0304659 A1* | 12/2012 | Berkebile | F01D 9/023 |
| | | | 60/754 |
| 2013/0000310 A1* | 1/2013 | Chokshi | F23R 3/08 |
| | | | 60/755 |
| 2016/0153842 A1* | 6/2016 | Cheverton | G01L 1/24 |
| | | | 374/121 |
| 2016/0177772 A1 | 6/2016 | Smith et al. | |
| 2016/0252420 A1 | 9/2016 | Koonankeil | |
| 2016/0273377 A1* | 9/2016 | Giri | F01D 5/082 |
| 2017/0052070 A1* | 2/2017 | Marsh | G01N 25/72 |
| 2018/0112534 A1* | 4/2018 | Snider | F01D 5/286 |
| 2018/0163554 A1* | 6/2018 | O'Leary | F01D 5/147 |
| 2018/0321113 A1* | 11/2018 | Wang | F01D 21/003 |
| 2019/0317025 A1* | 10/2019 | Nayeri | G01M 15/14 |
| 2020/0080443 A1* | 3/2020 | Dyer | F01D 17/162 |
| 2020/0094357 A1* | 3/2020 | Martin | B22C 9/24 |
| 2020/0378305 A1* | 12/2020 | Dudebout | F01D 5/186 |

* cited by examiner

ENGINE COMPONENT PERFORMANCE INSPECTION SLEEVE AND METHOD OF INSPECTING ENGINE COMPONENT

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary engine components, such as turbine blades, generally include one or more interior cooling circuits for routing the cooling air through the blade to cool different portions of the component, and include cooling air exhaust holes, such as film holes, used to cool the component operating in the heightened temperatures. After manufacture, it is important to test the component to ensure that the cooling air exhaust holes are operating sufficiently before utilizing the component in the field. Current method of testing the components include water inspection, airflow checks, pin checks, and geometric measurements to ensure acceptable performance of the final produced part. Such inspections are costly and time consuming.

BRIEF DESCRIPTION OF THE INVENTION

In one aspect, the present disclosure relates to a method of inspecting the cooling holes of a component for a turbine engine, the method comprising: placing a cover proximate at least some of the cooling holes; emitting a fluid from the cooling holes, with the fluid being at different temperature than the cover; determining the thermal signature of the emitted fluid impacting the cover to form a determined thermal signature; and comparing the determined thermal signature to a reference thermal signature.

In another aspect, the present disclosure relates to A method of inspecting the cooling holes of a component for a turbine engine, the method comprising: placing a cover proximate at least some of the cooling holes; emitting a fluid from the cooling holes; determining the signature of the emitted fluid on the cover to form a determined signature; and comparing the determined signature to a reference signature.

In yet another aspect, the present disclosure relates to a system for the inspection of an engine component having a cooling hole, the system comprising: a cover provided proximate the cooling hole of the engine component; wherein the sleeve is configured to measure a fluid output of the cooling hole and the fluid output is comparable to a reference fluid output to determine operation of the cooling hole.

DETAILED DESCRIPTION OF THE INVENTION

Figure 1:
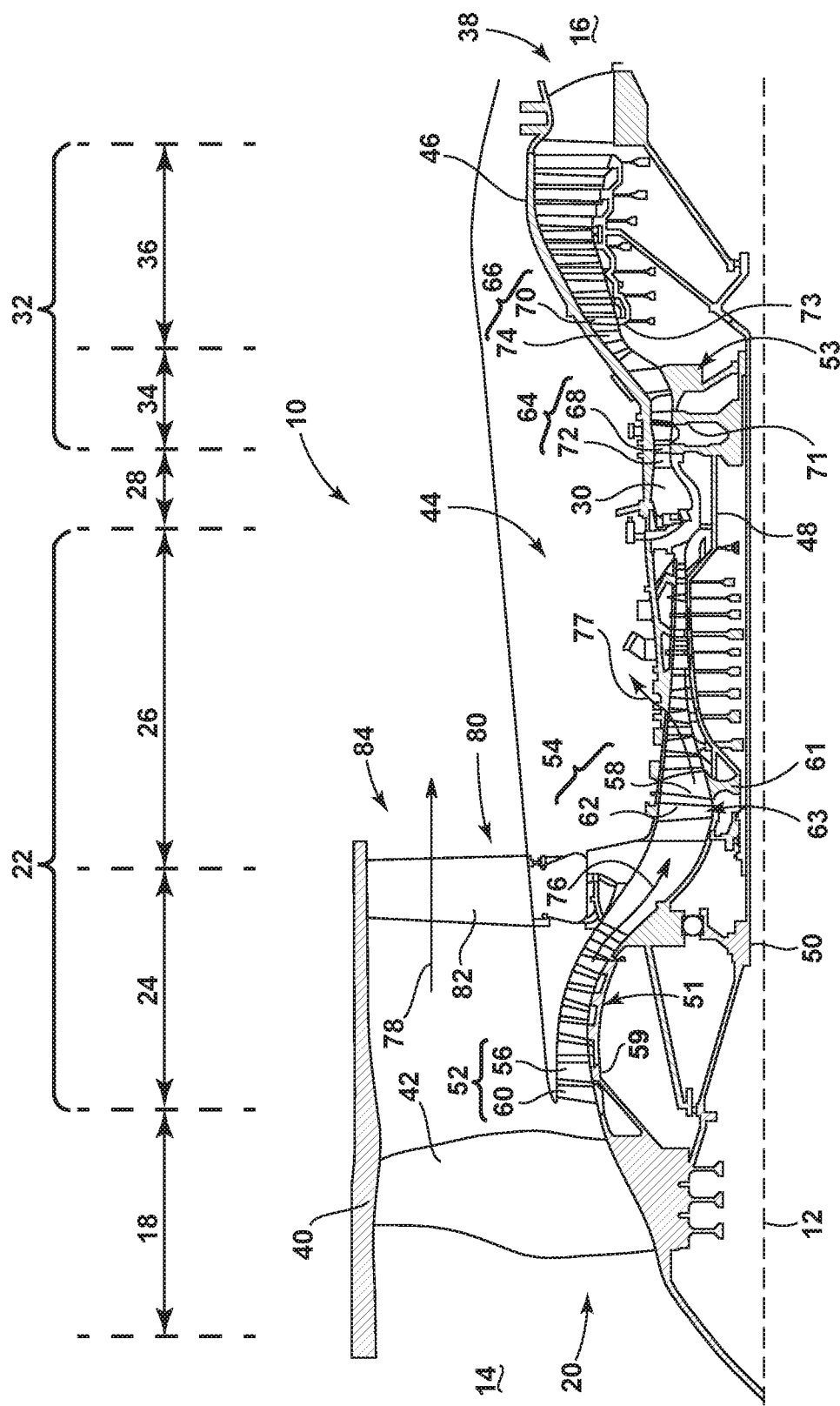
FIG. 1 is a schematic cross-sectional diagram of a gas turbine engine for an aircraft.

Aspects of the disclosure described herein are directed to an inspection sleeve for an engine component. For purposes of illustration, the present disclosure will be described with respect to a turbine blade airfoil for an aircraft gas turbine engine. It will be understood, however, that aspects of the disclosure described herein are not so limited and may have general applicability within an engine, including compressors as well as other engine components, such as those requiring cooling and film cooling, as well as in non-aircraft applications, such as other mobile applications and non-mobile industrial, commercial, terrestrial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
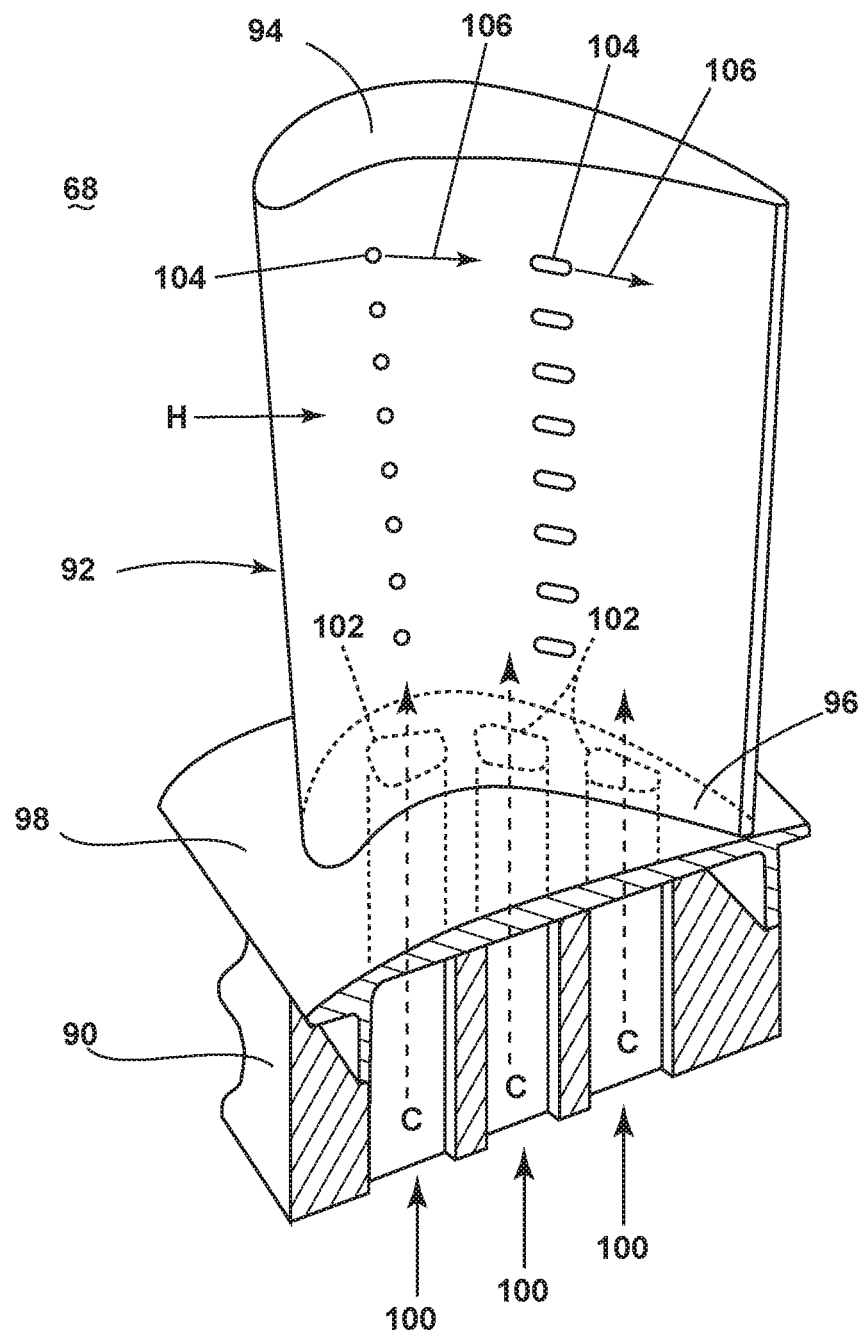
FIG. 2 is a perspective view of an engine component of the gas turbine engine of FIG. 1 shown in the form of a turbine blade airfoil having film holes.

FIG. 2 shows an engine component in the form of one of the turbine blades 68 of the engine 10 from FIG. 1. While the description herein is directed to a turbine blade 68, it should be appreciated that the concepts can have applicability in any engine component requiring cooling holes, film holes, or other cooling features. The turbine blade 68 includes a dovetail 90 and an airfoil 92. The airfoil 92 includes a tip 94 and a root 96 defining a span-wise direction therebetween. The airfoil 92 mounts to the dovetail 90 at a platform 98 at the root 96. The platform 98 helps to radially contain the turbine engine mainstream airflow. The dovetail 90 can be configured to mount to a turbine rotor disk 71 on the engine 10 of FIG. 1. The dovetail 90 further includes at least one inlet passage 100, exemplarily shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90.

A set of cooling features shown as film holes 104 are provided on the airfoil 92. As used herein, a film hole 104 and cooling hole can be used interchangeably, being a hole in an engine component that emits a fluid, such as a cooling fluid to cool the engine component. A cooling fluid C that is passed into the airfoil 92 from the inlet passages 100 can be exhausted from the airfoil 92 as a cooling film 106 via the film holes 104. The cooling film exhausted from the film holes 104 provides for separating a hot gas flow H from the airfoil 92, which provides for maintaining a cooled temperature for the airfoil 92 during engine operation.

Figure 3:
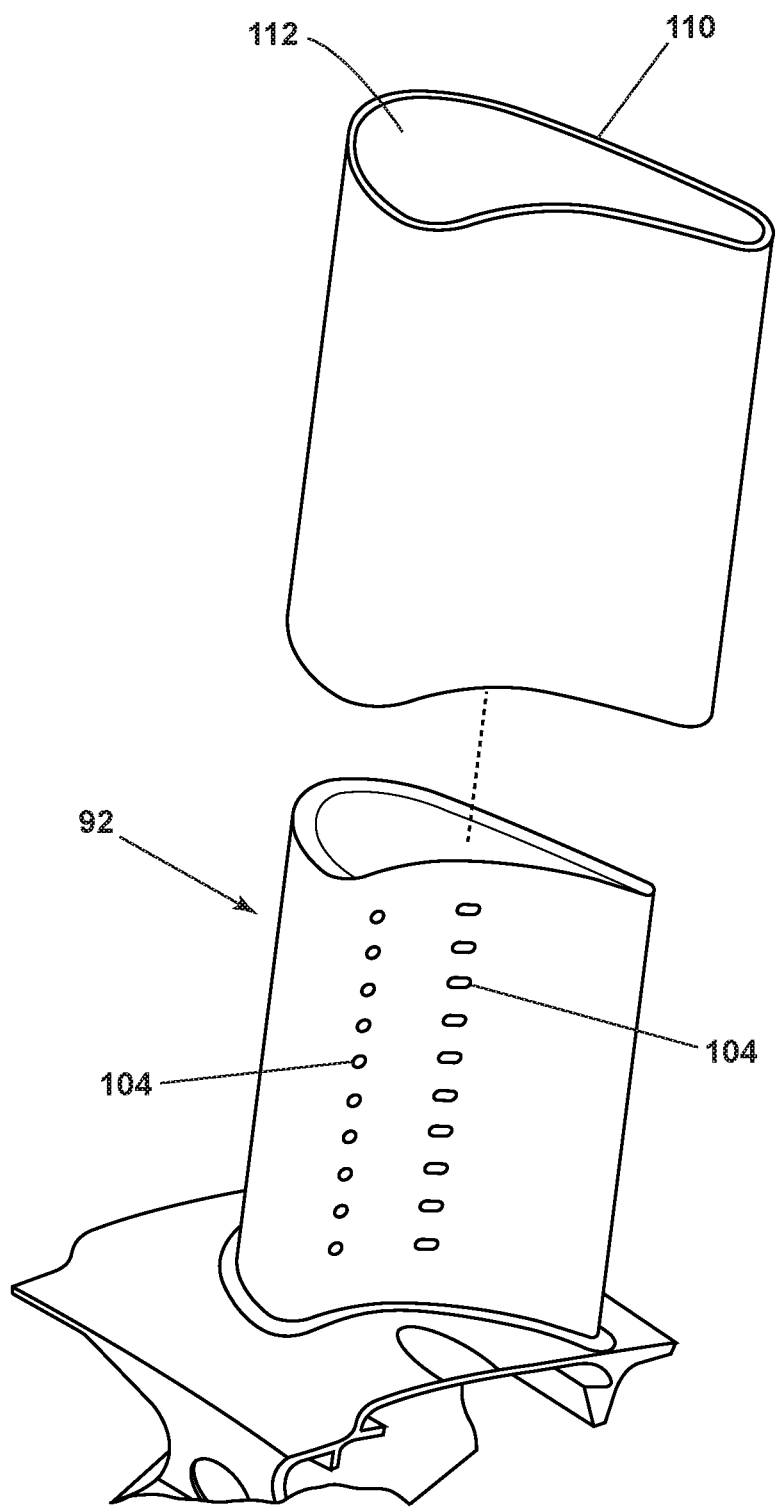
FIG. 3 is an exploded view of an inspection sleeve exploded from the turbine blade airfoil of FIG. 2.

An engine component such as the airfoil 92 can be manufactured by known methods, such as casting or additive manufacturing in non-limiting examples. After manufacture, the engine component is tested to ensure proper operation before use in the field. Referring now to FIG. 3, a cover shown as an inspection sleeve 110 can be used to inspect the film holes 104 of the airfoil 92. While shown that the inspection sleeve 110 sized and shaped complementary to the airfoil 92, it should be appreciated that the cover can be any suitable shape or size to position proximate one or more cooling holes of any engine component requiring testing of cooling holes. In one example, the cover can be a planar sheet, mounted to be positioned proximate the cooling holes of the engine component. The inspection sleeve 110 can be made of a metallic material, such as aluminum or steel in non-limiting examples, or can be optically transparent. The inspection sleeve 110 can be covered with an enhancement coating or paint 112, such as a fluorescent or infrared paint, a fluorescent molecule paint, a pressure sensitive paint, or a temperature sensitive paint. Optionally, the inspection sleeve 110 can contain thermochromatic liquid crystals on the interior of the inspection sleeve 110.

Figure 4:
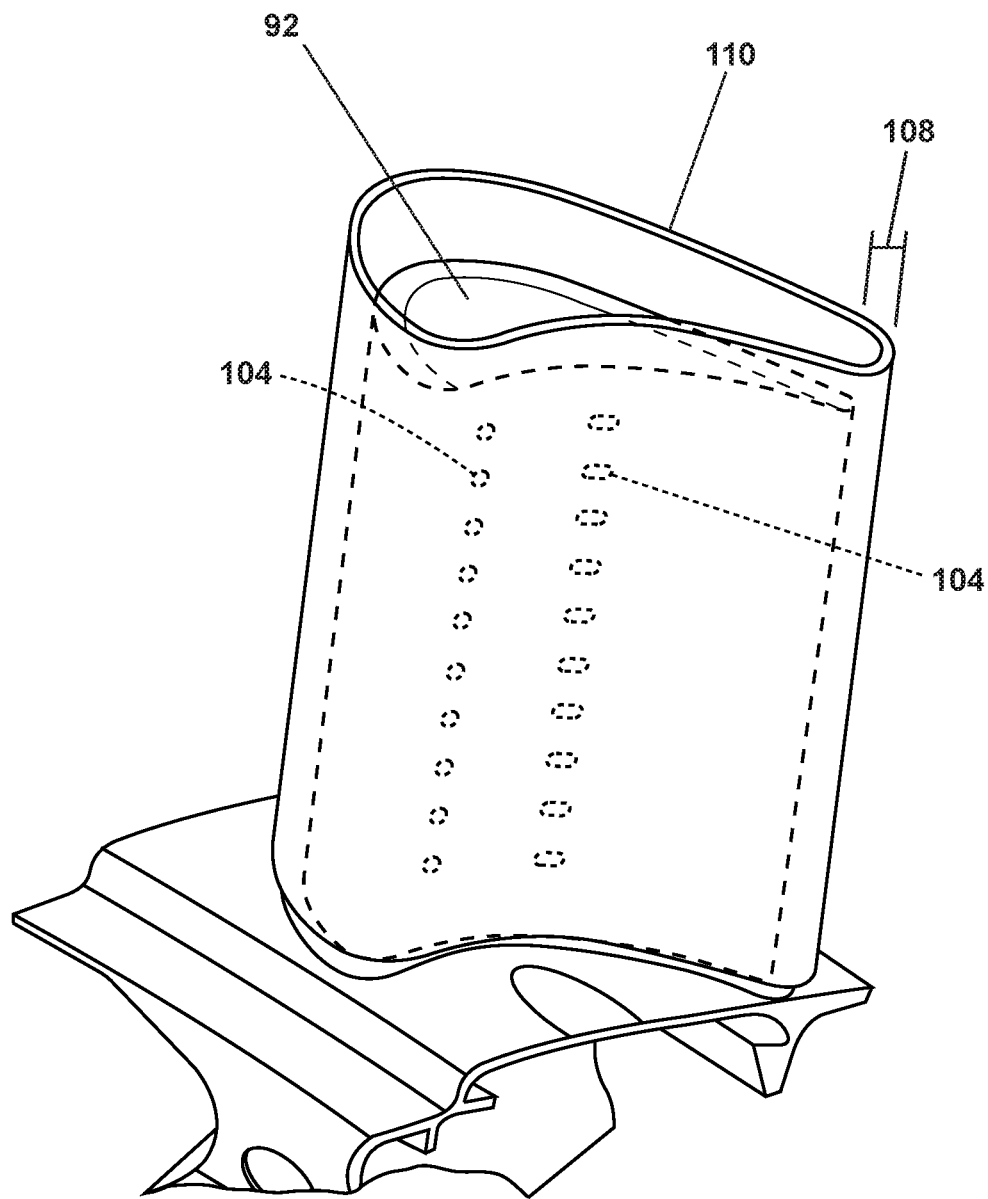
FIG. 4 is a perspective view of the inspection sleeve of FIG. 3 placed around the turbine blade airfoil.

Referring now to FIG. 4, the inspection sleeve 110 can be placed proximate at least some of the film holes 104. As shown, the inspection sleeve 110 can at least partially surround and enwrap the airfoil 92 such that walls of the inspection sleeve 110 are placed proximate and adjacent to, but spaced from the film holes 104 by a predetermined difference. The predetermined difference can be a gap 108. The gap 108 can be determined as a function of the cooling holes, such as a function of the diameter or effective diameter of the cooling holes. In one example, the gap can be sized between 0.2 and 3.0 times the effective diameter. The effective diameter can be defined as the diameter of the film hole 104 when the film hole is circular, in one non-limiting example. Alternatively, one additional example, the effective diameter can be the diameter of the film hole 104 at the outlet of the film hole 104. In yet another example, where the cooling hole or the outlet thereof is not circular, the effective diameter can be defined as the greatest cross-sectional length for the cooling hole or the outlet of the cooling hole. In yet another example, where the cooling hole or the outlet thereof is not circular, the effect diameter can be defined as the average or mean cross-sectional length for the cooling hole or the outlet of the cooling hole.

It is further contemplated that the inspection sleeve as described herein can be utilized with testing of additional engine components, such as a vane, a blade, a shroud, or a combustor liner in non-limiting examples, while any engine component utilizing a cooling hole, a cooling film, or cooling is contemplated. Furthermore, the cover need not be an inspection sleeve that surrounds or enwraps the component, or is even exterior of the component. For example, the cover could be configured to insert into a portion of the engine component, spaced from a cooling hole within the engine component, and removed to analyze information recorded on the inspection sleeve.

Figure 5:
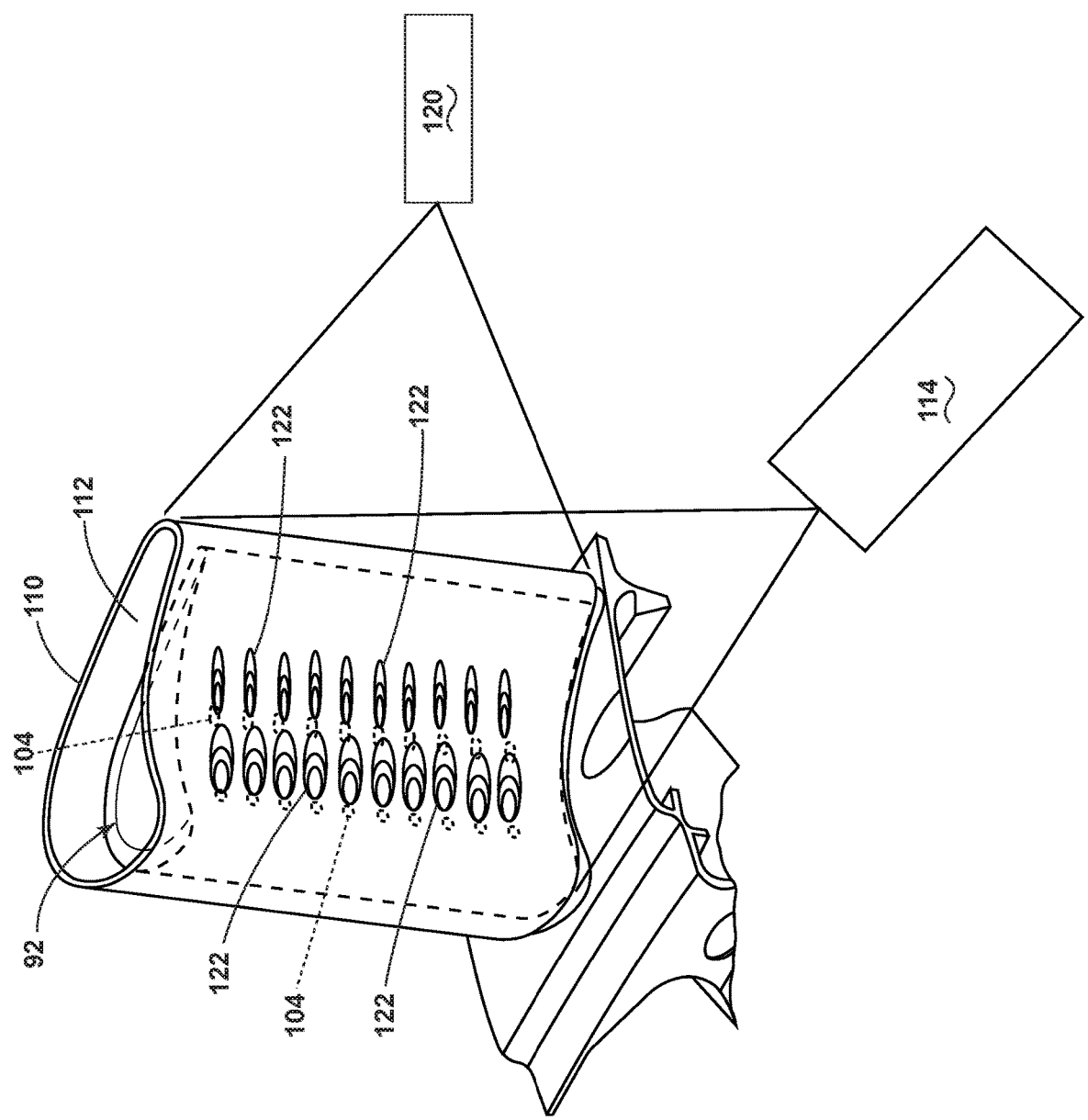
FIG. 5 is a perspective view of the inspection sleeve and turbine blade airfoil of FIG. 4 with a camera and a lamp directed at the inspection sleeve.

Referring now to FIG. 5, a sensor such as a camera 120 can be directed at the inspection sleeve 110 to measure the inspection sleeve 110. Optionally, a lamp 114 or light, such as an ultraviolet (UV) light, can be directed at the inspection sleeve 110 configured to excite a portion of the inspection sleeve 110, such as the enhancement coating 112, in response to a flow of air or temperature acting on the inspection sleeve 110, in order to improve measurement of the inspection sleeve 110 by the camera 120.

In one example, the camera 120 can be an infrared camera, and can measure an output 122 of the film holes 104 based upon a temperature change of the inspection sleeve 110 measurable by the infrared camera 120. Upon a measurement, the camera 120 can output an infrared image. In this way, the image is representative of the operation of the film holes 104. This image can be analyzed to determine if the airfoil 92 or any film holes 104 are operating properly or if there are any defects.

Alternatively, the inspection sleeve 110 can have other enhancement coatings 112, such as the fluorescent molecule paint or the thermochromatic liquid crystals provided on the interior surface of the inspection sleeve 110, such that an airflow exhausting from the film holes 104 can impinge upon the enhancement coating 112 when placed adjacent the airfoil 92. The lamp 114 or UV light can be used to excite the points along the inspection sleeve 110 so the camera 120 can measure the operation of the film holes 104 as the air impinges upon the inspection sleeve 110. In such an example, the inspection sleeve 110 can be optically transparent, such that the camera 120 can measure a change in the fluorescent molecule paint or the thermochromatic liquid crystals through the walls of the inspection sleeve 110. Therefore, any suitable coating, treatment, or otherwise can be used to provide an output on the inspection sleeve 110 that is measureable by the sensor or camera 120 to determine an operation of the film holes 104 of the airfoil 92. The lamp 114 can be used to excite the enhancement coating to make such an output 122 measurable by the camera 120, where the output may not be otherwise measurable.

In one exemplary operation, the inspection sleeve 110 can be heated or cooled. A flow of air can be provided through the airfoil 92 and can impinge upon the inspection sleeve 110 exhausting from the film holes 104. The flow of air can have a temperature difference relative to the heated or cooled inspection sleeve 110. In this way, the enhancement coating, such as a temperature sensitive paint, can provide a measurable response on the inspection sleeve 110. For example, the inspection sleeve 110 can be cooled and a hot flow of air can be provided to the airfoil 92 to impinge upon the inspection sleeve 110.

Figure 6:
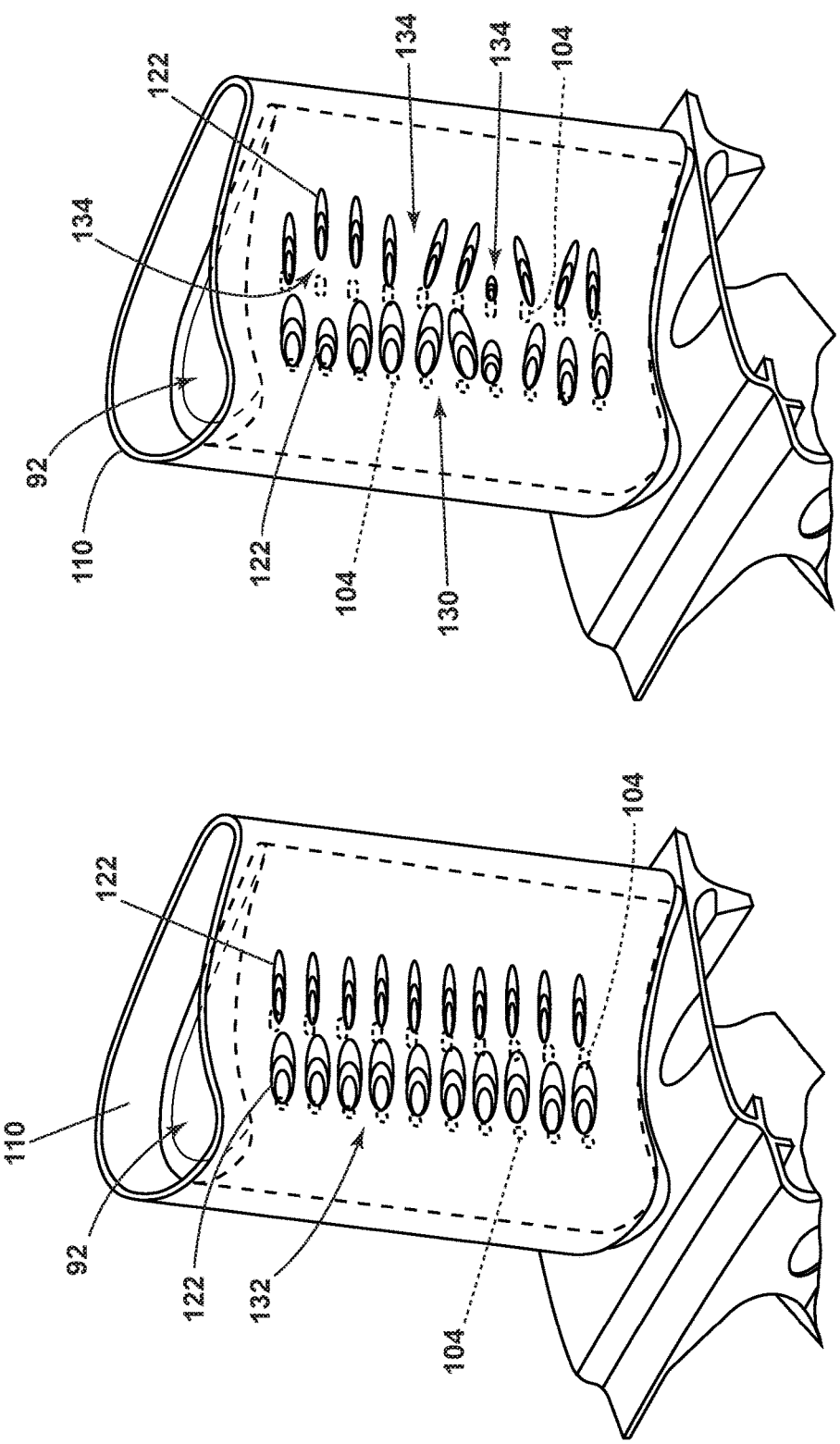
FIG. 6 is a schematic view of a comparison between operation of the turbine blade airfoil as identified by the inspection sleeve of FIG. 5 and a turbine blade with design standards as intended.

Referring now to FIG. 6, upon measuring the output 122, a signature 130, such as a thermal signature or a pressure signature, can be determined for the airfoil 92. The signature 130 can be compared with a reference signature 132 representative of preferred or optimal performance of the airfoil 92. In one example, the reference signature 132 can be represented as an image. The output signature 130 can be recorded as an image and compared with the image reference signature 132 image. In such an example, a specific comparison between individual pixels or image color can be made for comparing the signature 130 to the reference signature 132. The pixels can relate to a measurement of output area, while the color may relate to output temperature. Either or both of the area or temperature could be used to make a comparison between the signatures 130, 132.

Additional means of determining an output signature for comparison are contemplated beyond capturing an image, such as an electrical signal or current measured at the inspection sleeve 110 in non-limiting examples.

A computer or software system can make such a comparison, which can quickly and efficiently determine whether the signature 130 is presented within a predetermined tolerance for the reference signature 132. Whether or not the signature 130 falls within the predetermined tolerance can be resultant of an algorithm or analysis performed by the computer of comparisons of the signature 130 and the reference signature 132. Such a predetermined tolerance can be pre-determined by the manufacturer, such as less than a 10% error or deviation from the reference signature 132, while any predetermined tolerance is contemplated. In one example, the user can set the predetermined tolerance for the specific implementation as desired.

Additionally, the predetermined tolerance can be discrete, such as being specific to each individual film hole 104, such that each film hole 104 must be within a predetermined tolerance. If the comparison between the signature 130 and the reference signature 132 determines one or more defects 134 that are outside of the predetermined tolerance, the part can be determined unsuitable for use. The defect 134 can be based upon an output 122 that is outside of the predetermined tolerance. As is appreciable in FIG. 6, the defects can be resultant of small flows, lesser flows, large flows, improperly angled flows, improper output patterns, improper spacing, while other defects resulting in an output 122 that is outside of the predetermined tolerance is contemplated.

Therefore, the cover or inspection sleeve 110 can provide for quickly and effectively measuring the performance of a final product engine component. Historically, manufactured parts are subjected to one or more of pin checking, which is only local to a small area of the part, airflow checks, which only measure the overall tolerance of the entire system, or water and geometric checks, which are costly and time consuming. Additional checks can be intrusive to the part, such as utilizing a fluorescent molecule paint on the part itself. Therefore, the inspection sleeve 110 or cover provides for a quick and easy measurement of operation of the airfoil 92 or any suitable engine component with fluid passages or cooling holes. The inspection sleeve 110 further provides for faster inspection with reduced inspection costs. The inspection sleeve 110 can also provide for improved accuracy or precision during inspection, which can lead to increased part lifetime or reduced maintenance, which further reduces cost, or can even increase overall average efficiency for the component, industry wide. Further yet, an analysis of the engine component with the inspection sleeve 110 can provide for a better understanding of local use, which can lead to a greater understanding of where or why a failure might or has occurred. Such information can be stored in a database for review or analysis at a later time. For example, where a particular cooling hole 104 was within the predetermined tolerance at less than 10% variation, subsequent issues with the part or the cooling hole could lead to an updated requirement for the particular cooling hole, such as requiring less than 2% variation for that cooling hole 104 from the reference signature 132 to reduce or eliminate said issues with that cooling hole 104.

The cover or inspection sleeve 110 can be manufactured in any suitable manner, such as casting or additive manufacturing. Additively manufacturing the inspection sleeve 110 can provide for creating complex or detailed geometries for analyzing complex parts, while keeping costs low. One inspection sleeve 110 can be used repeatedly for multiple inspections, without requiring a new sleeve for each inspection.

Figure 7:
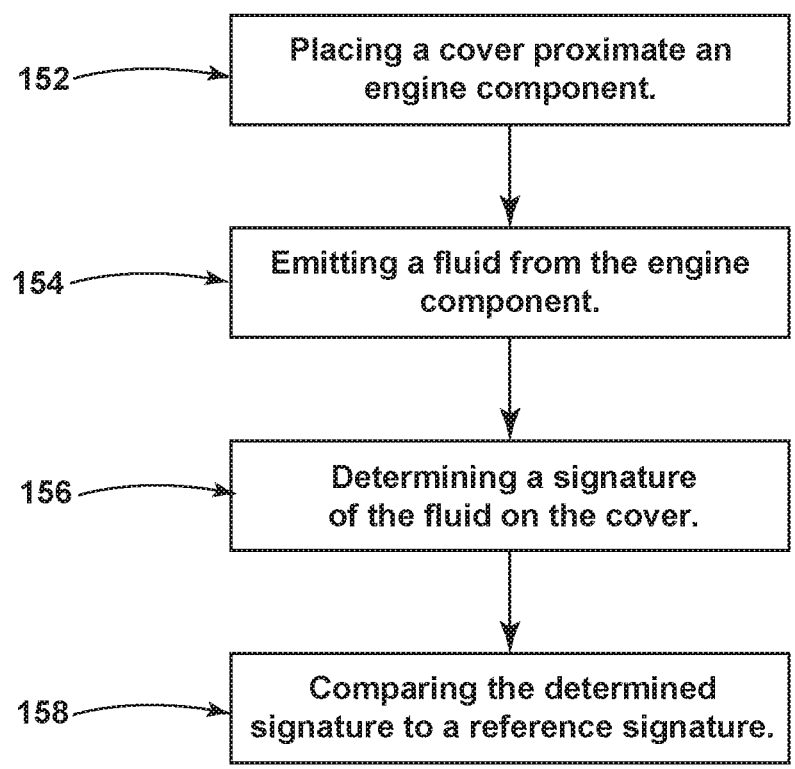
FIG. 7 is a flow chart illustrating a method of inspecting cooling holes of a component for a turbine engine.

Referring now to FIG. 7, a flow chart 150 depicts a method for inspecting the cooling holes of a component of a turbine engine, such as the film holes 104 in the airfoil 92 as described in FIGS. 1-6. The method can include: at step 152, placing a cover proximate the engine component; at step 154, emitting a fluid from the engine component; at step 156, determining a signature of the fluid on the cover; and, at step 158, comparing the determined signature to a reference signature.

At step 152, a cover, such as the inspection sleeve 110 as described herein, can be placed proximate to or adjacent to at least some of the cooling holes on the engine component. In the case where the cover is not a sleeve, such as a plate, the cover can be mounted and positioned proximate at least some of the cooling holes. The cover can also partially surround, wholly surround, or enwrap a portion of the engine component, and can be shaped to conform to the shape of at least a portion of the engine component. Additionally, placing the cover proximate the cooling holes can include placing the cover a predetermined distance from at least some of the cooling holes. The predetermined distance can be formed as or defined a gap between the cover and the cooling holes. The gap can be a function of the effective diameter of the cooling holes, such as being within the range of 0.2 to 3.0 times the effective diameter of the cooling holes. Additionally, the cover can include a thermal enhancement coating, which can be facing or confronting the cooling holes. The thermal enhancement coating can be infrared pain, fluorescent molecule paint, or thermochromatic liquid crystals, while any coating suitable to identify the operation of the cooling holes is contemplated.

At step 154, emitting a fluid from the engine component can include emitting, such as blowing, passing, or otherwise exhausting a fluid from the engine component at the cooling holes. The fluid can be air, for example, while other fluids are contemplated. The fluid can be thermally treated, for example, so that the fluid is at a different temperature than the cover, facilitating a change that is identifiable at the cover as a temperature change. Such a thermal treatment can be heating or cooling, for example.

At step 156, determining a signature of the fluid on the cover can include reading, sensing, or measuring the cover in order to determine an output of the fluid from the cooling holes at the cover. A sensor, such as the camera 120 can be used to determine the signature of the fluid on the cover. Additionally, a lamp or other device can be used to excite or otherwise render identifiable the signature on the cover. The signature can be recorded and saved, such as recording an image of the signature, such as a thermal image. In one example, the signature can be a temperature signature or a pressure signature.

At step 158, the signature of the cover can be compared to a reference signature. Such as comparison can be used to identify differences in the signatures, representative of defects in the cooling holes or the engine component. Such as comparing can also include determining a difference between the determined signature and the reference signature based on the comparison. The comparison can be made by a computer system, such as a software program adapted to make comparisons between the component signature and the reference signature to make a determination of whether the difference between the two meets a predetermined threshold for the entire component, or for each individual cooling hole. Such a comparison can further include comparing at least one of an area or an angle of a portion of the thermal signature corresponding to at least one of the cooling holes. In one example, the signature can be a thermal image comparable to a reference thermal image as the reference signature, while it is contemplated that the signatures can be based upon pressure of the fluid emitted from the cooling holes.

Additionally, the method can include indicating when the difference between the signature and the reference signature exceeds a predetermined tolerance. The method can further include repairing the component when the predetermined tolerance is exceeded.

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
    placing a cover proximate and at a predetermined distance from at least one cooling hole of a component for a turbine engine, whereby the cover conforms in shape to at least a portion of the component;
    emitting a fluid from the at least one cooling hole, with the fluid being at different temperature than the cover;
    determining a thermal signature of the emitted fluid impacting the cover to form a determined thermal signature; and
    comparing the determined thermal signature to a reference thermal signature to determine whether at least one cooling hole operates properly;
    wherein the predetermined distance is a function of an effective diameter of the at least one cooling hole.

2. The method of claim 1 further comprising determining a difference between the determined thermal signature and the reference thermal signature based on the comparison of the determined thermal signature and the reference thermal signature.

3. The method of claim 2 further comprising indicating when the difference exceeds a predetermined tolerance.

4. The method of claim 1 wherein the cover conforms in shape to at least a portion of the component.

5. The method of claim 1 wherein the predetermined distance is within a range of 0.2 to 3 times the effective diameter.

6. The method of claim 1 further comprising a thermal enhancement coating on the cover and confronting the at least one cooling hole.

7. The method of claim 6 wherein the thermal enhancement coating comprises infrared paint.

8. The method of claim 1 wherein the comparing comprises comparing a portion of an area of the determined thermal signature corresponding to the at least one cooling hole.

9. A method, comprising:
    placing a cover proximate at least one cooling hole of a component for a turbine engine;
    emitting a fluid from the at least one cooling hole, with the fluid being at different temperature than the cover;
    determining a thermal signature of the emitted fluid impacting the cover to form a determined thermal signature; and
    comparing the determined thermal signature to a reference thermal signature to determine whether at least one cooling hole operates properly;
    wherein the comparing comprises comparing a portion of an area of the determined thermal signature corresponding to the at least one cooling hole to a corresponding area of the reference thermal signature.

10. The method of claim 9 further comprising indicating when a difference between the determined thermal signature and the reference thermal signature exceeds a predetermined tolerance.

11. The method of claim 9 further comprising treating the cover with a thermal enhancement coating.

12. The method of claim 11 wherein the thermal enhancement coating comprises at least one of an infrared paint, a fluorescent molecule paint, or thermochromatic liquid crystals.

* * * * *